United States Patent
Jiang et al.

(10) Patent No.: US 11,205,262 B2
(45) Date of Patent: Dec. 21, 2021

(54) ONLINE DETECTION METHOD OF CIRCULAR WEFT KNITTING STRIPE DEFECTS BASED ON GRAY GRADIENT METHOD

(71) Applicant: Jiangnan University, Wuxi (CN)

(72) Inventors: Gaoming Jiang, Wuxi (CN); Honglian Cong, Wuxi (CN); Fenglin Xia, Wuxi (CN); Qi Zhang, Wuxi (CN); Peixiao Zheng, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/374,028

(22) Filed: Jul. 13, 2021

(65) Prior Publication Data
US 2021/0343002 A1 Nov. 4, 2021

Related U.S. Application Data

(63) Continuation of application No. PCT/CN2020/139463, filed on Dec. 25, 2020.

(30) Foreign Application Priority Data

Jul. 28, 2020 (CN) .......................... 202010740071.0

(51) Int. Cl.
*G06T 7/00* (2017.01)
*G06K 9/62* (2006.01)

(52) U.S. Cl.
CPC .......... *G06T 7/0004* (2013.01); *G06K 9/6256* (2013.01); *G06T 2207/30124* (2013.01); *G06T 2207/30204* (2013.01)

(58) Field of Classification Search
CPC .......... G06T 7/0004; G06T 2207/30124; G06T 2207/30204; G06K 9/6256
See application file for complete search history.

(56) References Cited

U.S. PATENT DOCUMENTS 5,774,177 A * 6/1998 Lane .................... D06H 3/08
348/128
6,100,989 A * 8/2000 Leuenberger ...... G01N 21/8983
250/208.1

(Continued)

FOREIGN PATENT DOCUMENTS

CN 106204543 A 12/2016
CN 107132235 A 9/2017

(Continued)

OTHER PUBLICATIONS

Kopaczka et al., "Automated Enhancement and Detection of Stripe Defects in Large Circular Weft Knitted Fabrics", IEEE (Year: 2016).*

(Continued)

*Primary Examiner* — Aaron W Carter
(74) *Attorney, Agent, or Firm* — IPro, PLLC

(57) ABSTRACT

The disclosure discloses an online detection method of circular weft knitting stripe defects based on a gray gradient method, and belongs to the technical field of textile product detection. The method provides a defect detection and positioning method based on the gray gradient method. Before the detection on a new product, only a model needs to be trained to obtain stripe defect feature images with different stitch types and different stitch densities, and the detection is directly performed in a subsequent process. Defects can be fast and accurately recognized, and a cam position causing the stripe defects can be calculated according to a quantity of shot images between the feature images and a marked image, courses in which marks in the marked image are located, courses in which defects in a defect image are located, and machine operation parameters. Moreover, a defect detection device required by the disclosure can be (Continued)

modified on an original circular knitting machine, so the detection cost is reduced.

10 Claims, 3 Drawing Sheets

(56) References Cited

U.S. PATENT DOCUMENTS

| | | | | |
|---|---|---|---|---|
| 2002/0054293 A1* | 5/2002 | Pang | ............ | G01N 21/898 |
| | | | | 356/430 |
| 2017/0321356 A1* | 11/2017 | Wan | ............ | D04B 9/42 |
| 2018/0096178 A1* | 4/2018 | Gonzales, Jr. | ........ | G06Q 30/018 |
| 2020/0308739 A1* | 10/2020 | Dong | ............ | D04B 21/16 |

FOREIGN PATENT DOCUMENTS

| | | |
|---|---|---|
| CN | 110097538 A | 8/2019 |
| CN | 111862069 A | 10/2020 |
| JP | 2020106295 A | 7/2020 |

OTHER PUBLICATIONS

Mengtao Wang et. al., "Fabric defect detection based on gray-level gradient co-occureence matrix and SVDD", Journal of silk, vol. 55, No. 12, Dec. 2018.

* cited by examiner

ONLINE DETECTION METHOD OF CIRCULAR WEFT KNITTING STRIPE DEFECTS BASED ON GRAY GRADIENT METHOD

TECHNICAL FIELD

The disclosure relates to an online detection method of circular weft knitting stripe defects based on a gray gradient method, and belongs to the technical field of textile product detection.

BACKGROUND

With the development of knitting industry, the quality control of knitted products is more and more concerned by people. As an important content of quality control of knitted fabrics, the defect detection of knitted fabrics is directed to timely find and repair defects.

A stripe defect is one of the most serious defects of the weft-knitted fabrics, and is characterized in that one or more course loops in the fabric surface are larger or smaller than normal loops. The stripe defect greatly influences the appearance of a finished fabric product, may cause uneven and unsmooth fabric surface and poor drapability of the fabric, and may even cause uneven luster of the fabric surface, i.e., deep color in positions with concentrated small loops and shallow color in positions with concentrated large loops, which causes the problems including reduced quality of the finished fabric product, and declined purchasing desire of consumers and the like.

At present, fabric defect detection can be divided into offline detection and online detection. For the offline detection, defects on the surface of the fabric are mainly found visually by a special inspecting worker, and the method is time and labor consuming, prone to be affected by subjective factors, high in missing detection ratio, high in labor cost and harmful to human bodies, and is unfavorable for sustainable development of new era. In order to overcome the defects of offline detection of the fabric defects, in recent years, detection methods relying on machine vision in online detection have become a scientific research hotspot and have gradually developed and applied.

However, in the prior art, the online detection is mainly applied to defect detection of woven fabrics or warp-knitted fabrics, and there are few methods for the defect detection of the circular weft-knitted fabrics. The existing technologies mostly adopt off-machine detection, real-time detection cannot be achieved, the data acquisition is lagging, and the efficiency is low. Additionally, the existing technologies cannot determine the reasons of the fabric defects through detection, so that the generation of defects cannot be avoided from source to the greatest extent. Therefore, a feasible real-time online detection method for defects of weft-knitted fabrics is needed for improving the production efficiency and product quality of the weft-knitted fabrics.

SUMMARY

In order to solve the problems in the prior art, the disclosure provides an online detection method of circular weft knitting stripe defects based on a gray gradient method. The method includes:

acquiring a real-time fabric image when a circular weft knitting machine operates, and using an image having marked courses as a marked image;

calculating a gradient image combining a direction x and a direction y of the real-time fabric image by using the gray gradient method;

extracting texture information of the gradient image by using a gray-level co-occurrence matrix method to obtain a feature image;

determining whether the real-time fabric image has defects or not according to the feature images, and determining whether the defects are stripe defects or not; and if the real-time fabric image has defects, and the defects are stripe defects, marking the real-time fabric image as a defect image, and calculating a cam position causing the stripe defects according to a quantity of shot images between the feature images and the marked image, courses in which marks in the marked image are located, courses in which defects in the defect image are located, and machine operation parameters.

Optionally, the determining whether the real-time fabric image has defects or not according to the feature images, and determining whether the defects are stripe defects or not includes:

performing comparison recognition on the feature images and a pre-acquired defect sample image so as to determine whether the real-time fabric image has defects or not and whether the defects are stripe defects or not;

a process of acquiring the defect sample image includes:

acquiring stripe defect fabric images with different stitch types and different stitch densities;

calculating a sample gradient image combining a direction x and a direction y of the stripe defect fabric images by using the gray gradient method;

extracting texture information of the sample gradient image by using a gray-level co-occurrence matrix method to obtain sample feature images; and classifying the acquired sample feature images according to the fabric types and the fabric densities to obtain a training sample set; and images in the training sample set are collectively referred to as defect sample images.

Optionally, the calculating a cam position causing the stripe defects according to a quantity of shot images between the feature images and the marked image, courses in which marks in the marked image are located, courses in which defects in the defect image are located, and machine operation parameters includes:

assuming that a height from the marked course in the marked image to a top edge of the marked image is $H_{BJ}$, a height from the stripe defect to a top edge of the defect image is $H_{CD}$, and an on-machine walewise density is cpc (courses/5 cm), then a calculation formula of a cam feed of the stripe defects being $$LS_{CD} = \left( \frac{(H_{CD} - H_{BJ}) \times cpc}{5 \times \text{scale}} - LS_{BJ} \right) \% LS,$$

where scale is a scaled-down proportion during fabric image acquisition; and the sign % represents remainder taking, LS is total feeds of a circular weft knitting machine, and $LS_{BJ}$ is a marked feed.

Optionally, the marked courses in the marked image are marked by color yarns.

Optionally, the method adopts an industrial camera to acquire the real-time fabric image when the circular weft knitting machine operates, and an interval time t of the acquisition is:

$$t = \frac{cpc \times H}{5} \times \frac{60}{v \times HL}$$

where H is a practical height of a fabric shot by the industrial camera, cm; v is a speed of the circular weft knitting machine, r/min; and HL is a course number corresponding to each revolution of the circular weft knitting machine rotates.

Optionally, according to the method, it is set that one fabric image is shot when the circular weft knitting machine rotates over a height shooting range of the industrial camera.

Optionally, the scaled-down proportion scale during fabric image acquisition by the industrial camera is a ratio of a top edge length of the acquired real-time fabric image to a top arc length of a practical image.

The disclosure is further directed to provide an online detection system for circular weft knitting stripe defects. According to the system, an industrial camera is additionally disposed outside a take-up and batching mechanism of a circular weft knitting machine, the industrial camera is connected with a computer to transmit an acquired real-time fabric image to the computer, and the computer performs stripe defect detection with the above method, and calculates a cam position causing the stripe defects when the stripe defects are detected.

Optionally, an illumination lamp is disposed inside a fabric so as to provide a light source, and the brightness of the illumination lamp is adjustable.

Optionally, the system further includes a warning device, the warning device is connected with the computer, and the warning device automatically warns when stripe defects are detected.

The disclosure has the following beneficial effects:

The disclosure provides a defect detection and positioning method based on a gray gradient method, the defects can be fast and accurately recognized, and the problem cam can be fast positioned, the defects are avoided or reduced in the knitting process to the greatest extent, the labor productivity is greatly improved, and the enterprise benefits are ensured. Moreover, a defect detection device required by the disclosure can be modified on an original circular knitting machine, so the detection cost is reduced.

According to the disclosure, the industrial camera and the external computer are additionally disposed on the circular weft knitting machine. Different from the prior art, the industrial camera of the disclosure is disposed outside the fabric, so that the disclosure can be applied to defect detection of a single-sided weft-knitted fabric, and is also applicable to defect detection of a double-sided weft-knitted fabric. Additionally, in the prior art, technology reverse side images of the fabric are acquired, while in the disclosure, the effect surface (technology front side) images of the fabric are acquired, so that the appearance defects of the fabric can be really detected. At the same time, the real-time online stripe defect detection can be realized, and the problems of data acquisition lagging, poor real-time performance, rework of workers and the like of the existing defect detection technology are solved.

BRIEF DESCRIPTION OF FIGURES

In order to more clearly illustrate the technical solutions of the embodiments of the disclosure, the drawings to be used in the description of the embodiments are briefly described below, and it is obvious that the drawings in the description below are only some embodiments of the disclosure, and a person of ordinary skill in the art can obtain other drawings from these drawings without any creative effort.

DETAILED DESCRIPTION

In order that the objects, technical solutions and advantages of the disclosure will become clearer, implementations of the disclosure will be further described in detail below with reference to the accompanying drawings.

Embodiment 1

This embodiment provides an online detection method of circular weft knitting stripe defects based on a gray gradient method. The method includes:

A real-time fabric image when a circular weft knitting machine operates is acquired, and an image having marked courses is used as a marked image.

A gradient image combining a direction x and a direction y of the real-time fabric image is calculated by using the gray gradient method.

Texture information of the gradient image is extracted by using a gray-level co-occurrence matrix method to obtain feature images.

Whether the real-time fabric image has defects or not is determined according to the feature images, and whether the defects are stripe defects or not is determined.

If the real-time fabric image has defects, and the defects are stripe defects, the real-time fabric image is marked as a defect image, and a cam position causing the stripe defects is calculated according to a quantity of shot images between the feature images and the marked image, courses in which marks in the marked image are located, courses in which defects in the defect image are located, and machine operation parameters.

By using the online detection method provided by this embodiment, the defects can be fast and accurately recognized, the problem cam can be fast positioned, the defects can be avoided or reduced in the knitting process to the greatest extent, the labor productivity is greatly improved, and the enterprise benefits are ensured.

Embodiment 2

This embodiment provides an online detection method of circular weft knitting stripe defects based on a gray gradient method. The method includes three parts:

1. Images having stripe defects with different stitch structures and different densities are acquired to be used as sample images, and are strained, and a feature value is extracted to be used as a training model.

2. The training model is used to detect a fabric image acquired in real time.

3. A feed in which the cam located is obtained through calculation according to marked courses, defect courses and machine parameter information.

Figure 1:
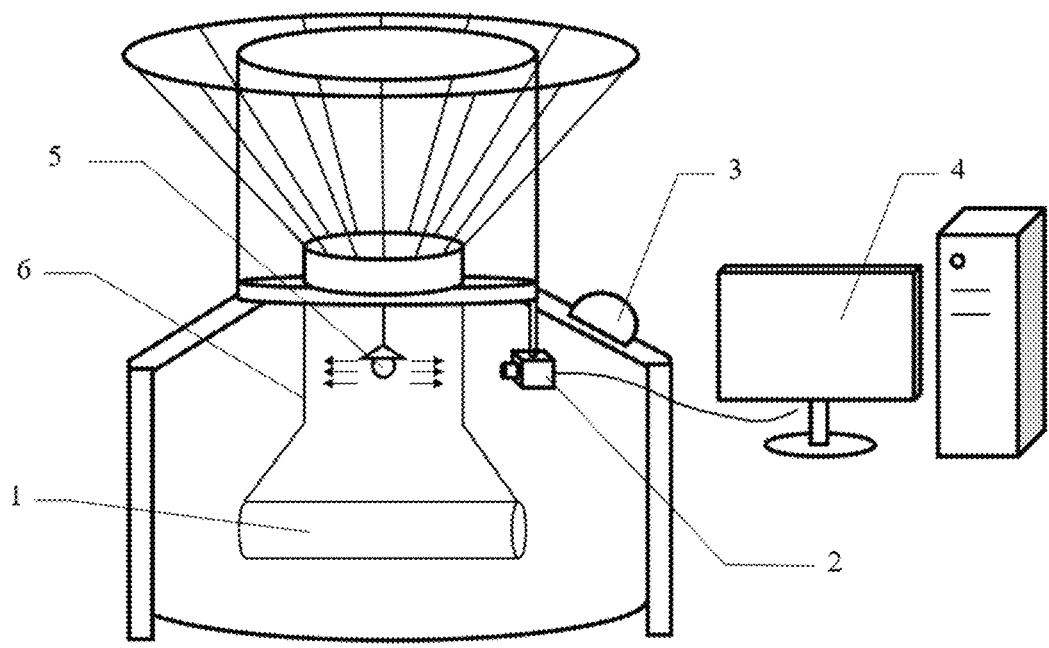
FIG. 1 is a schematic structural diagram of a machine framework for fabric image real-time acquisition in an embodiment of the disclosure, where 1 denotes a take-up and batching mechanism of a circular weft knitting machine, 2 denotes an industrial camera, 3 denotes a warning device, 4 denotes a computer, 5 denotes an illumination lamp, and 6 denotes a fabric.
Figure 2:
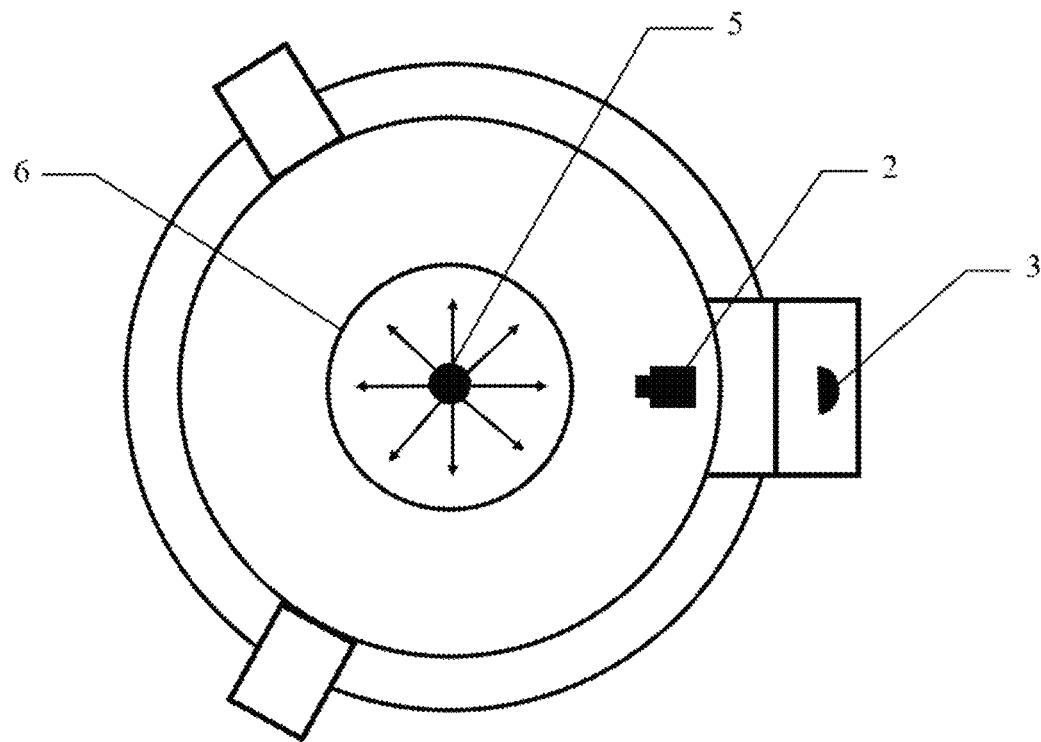
FIG. 2 is a top structural view for fabric image real-time acquisition in an embodiment of the disclosure.

In order to acquire data required by the online detection method, as shown in FIG. 1, an industrial camera 2 is additionally disposed outside a take-up and batching mechanism 1 of a circular weft knitting machine, the industrial camera 2 is connected with a computer 4, an illumination lamp 5 is disposed inside a fabric 6 so as to provide a light source, and the brightness is adjustable. The method includes the following steps:

Step (1): Acquisition of a real-time fabric image in a machine operation process by using a device as shown in FIG. 1.

Step (2): A sample straining stage.

Figure 3:
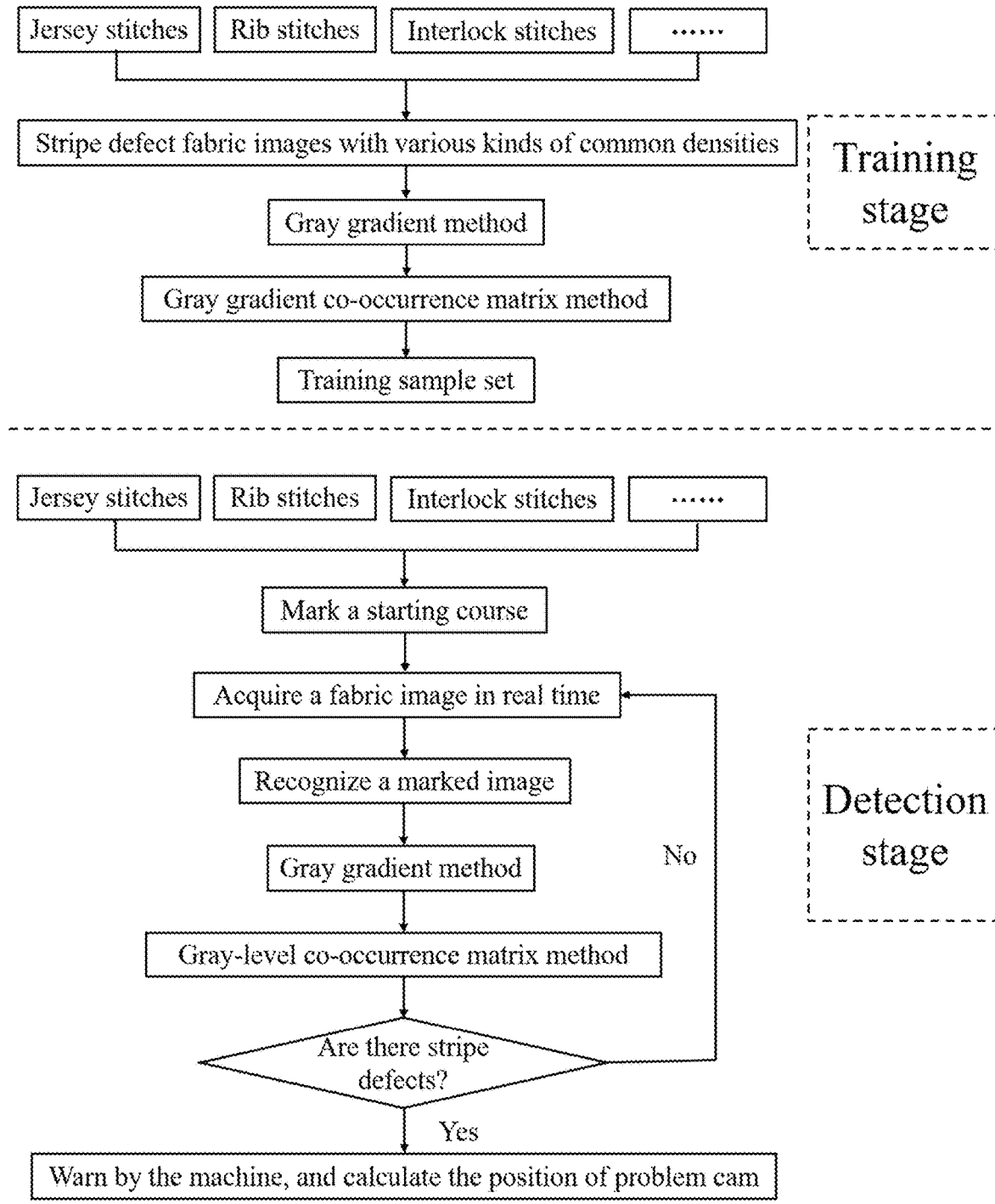
FIG. 3 is a schematic flow diagram of an online detection method of circular weft knitting stripe defects based on a gray gradient method in an embodiment of the disclosure.

The real-time fabric image in the machine operation process is used as a sample, as shown by the training stage in FIG. 3, stripe defect fabric images with different stitch types (such as jersey stitches, rib stitches and interlock stitches) and various kinds of common fabric walewise densities (such as 75 courses/5 cm, 100 courses/5 cm, 125 courses/5 cm, and 150 courses/5 cm) are preprocessed to be used as a training sample set. The specific implementations are as follows:

Step (2.1): When the weft knitting machine operates, stripe defect fabric images with different stitch structures and different densities are acquired by using the industrial camera 2.

Step (2.2): The acquired stripe defect fabric images are preprocessed, the fabric images with a certain radian are preprocessed into rectangular images, and influence of non-uniform illumination, noise and the like on the images is eliminated.

When the fabric image noise is reduced by an average filter, training image blur may be caused, and it is unfavorable for feature information extraction. Therefore, the disclosure uses the gray gradient method to calculate a gradient image combining a direction x and a direction y of the fabric image. A specifically used gray gradient formula is $M(x,y)=\sqrt{(gx)^2+(gy)^2}$.

In order to reduce the calculated amount, an absolute value approximate square and square root operation can be used, $M(x,y)=|gx|+|gy|$.

In the formula, gx represents a gradient value in the direction x, and gy represents a gradient value in the direction y.

Step (2.3): Texture information of the fabric images with different stitch structures is extracted by using a gray-level co-occurrence matrix method. In order to more intuitively describe texture conditions by a co-occurrence matrix, some parameters reflecting the matrix conditions are derived from the co-occurrence matrix. The acquired stripe defect feature images are classified to obtain a training sample set according to the fabric types and densities, and the images in the training sample set are collectively referred to as defect sample images.

Step (3): Defect detection preparation stage.

When the machine operates, a starting course is marked by yarns of different colors when the weft knitting machine operates. In this embodiment, a previous section of fed color yarn of the first yarn-guide is used as a marked course, the fabric is shot by using the industrial camera, it is set that a fabric image is shot when the machine rotates over a height shooting range of the industrial camera, and the shot image with the marked courses is used as a marked image. The specific implementations are as follows:

Step (3.1): When the machine operates, the feed in which the first yarn-guide located is used as the first feed, the first technology knitting row is knitted, a yarn different from the color of a fabric body is used as a marker, and the marking feed $LS_{BJ}$ is marked as 1.

It should be noted that the marking feed $LS_{BJ}$ refers to the feed of knitting system number knitted with the color yarns (the knitting system may also be called as the yarn guide), for example, the machine is totally provided with 48 feeds of knitting systems, in practical application, the color yarn is generally threaded in the first-feed knitting system for marking, and at this moment, the marking feed is 1; and if the color yarn is threaded in the twelfth-feed knitting system, the marking feed is 12.

Step (3.2): The machine speed is assumed to be a constant speed v (r/min), the on-machine walewise density is cpc (course/5 cm) of each stitch, the course number corresponding to each revolution of the machine rotates is HL, the fabric practical height shot by the industrial camera is H (cm), a next fabric image is immediately acquired each time that one height shooting range is rotated over, the image acquisition interval time is t (s), t can be obtained through calculation according to the above parameter information, and the calculation formula is $$t = \frac{cpc \times H}{5} \times \frac{60}{v \times HL}.$$

The fabric image acquired in this embodiment is in a size of 256×256 pixels, a fabric height formed by each revolution of the general machine knitting may be 3 to 4 cm, so that the whole complete cycle can be shot by taking one fabric image.

Step (3.3): A marking color is set in the computer. Firstly, the acquired image is subjected to color recognition. If the marking color is contained in the acquired image, the image is marked as the marked image, and is stored in a specified folder for subsequent comparison.

Step (4): Defect detection recognition stage.

The gray gradient method is used for defect detection on the fabric image acquired in real time. The specific implementations are as follows:

Step (4.1): After the computer acquires the real-time fabric image, fabric information is enhanced by using the gray gradient method to obtain an enhanced image, and abnormal image data such as nubs is removed. The method is similar to Step (2.2), the texture feature information is extracted by using a gray-level co-occurrence matrix method to obtain feature images, and the method is similar to Step (2.3).

Step (4.2): Comparison recognition is performed on the feature images and a training sample so as to determine whether the current image is a stripe defect image or not. If the current image is not the stripe defect image, a next real-time image is acquired for defect detection. If the current image is the stripe defect image, the position of problem cam can be calculated according to the marked course height and the defect course height.

Figure 4:
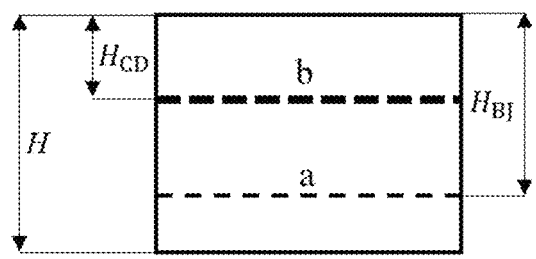
FIG. 4 is a schematic diagram for determining a problem cam feed according to a fabric stripe defect position in an embodiment of the disclosure.

Step (5): Calculation of the position of the problem cam. The cam position causing the stripe defects is calculated according to information such as courses in which marks in the marked image are located, courses in which defects are located, and machine operation parameters. The specific implementations are as follows:

Step (5.1): As shown in FIG. 4, a height from the marked course a in the fabric image to a top edge of the image is supposed to be $H_{BJ}$, a height from the stripe defect b to a top edge of the image is supposed to be $H_{CD}$, and an on-machine walewise density is cpc (courses/5 cm).

Figure 5:
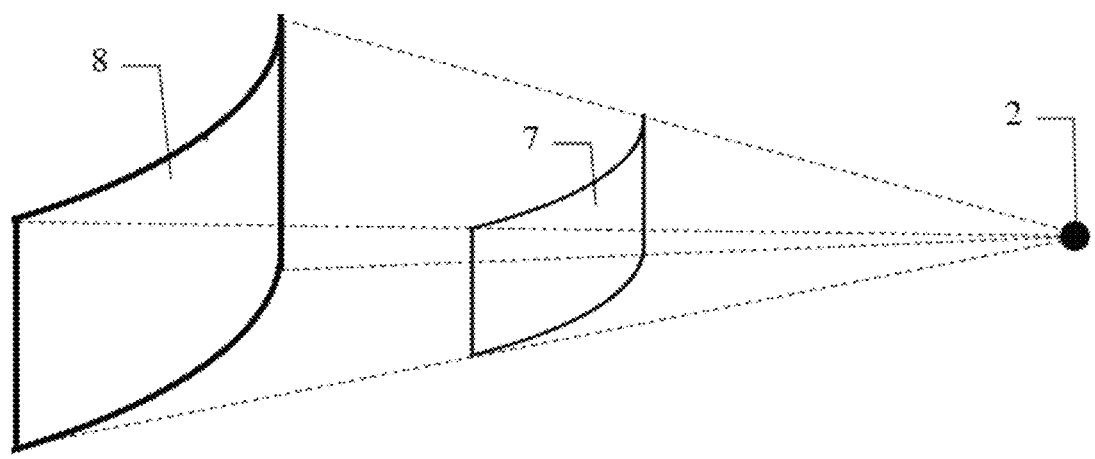
FIG. 5 is a schematic diagram of an image proportion during fabric image acquisition in an embodiment of the disclosure, wherein 7 denotes an acquired image, and 8 denotes a practical image.

As shown in FIG. 5, when the industrial camera 2 acquires the fabric image, the practical image will be scaled down according to a certain proportion, and the proportion scale is a ratio of a top edge length of the acquired image 7 to a top arc length of the practical image 8.

According to the above parameter information, a calculation formula of the stripe defect cam feed is $$LS_{CD} = \left( \frac{(H_{CD} - H_{BJ}) \times cpc}{5 \times \text{scale}} - LS_{BJ} \right) \% LS.$$

The sign % represents remainder taking, LS is total feeds of a machine, and $LS_{BJ}$ is a marked feed. In this embodiment, the marking feed is 1.

Step (5.2): After the stripe defects are detected, warning can be given out, or even the machine halt can be automatically performed, so that a knitter can conveniently and timely replace the problem cam or adjust a sinking depth to realize the real-time online detection of the stripe defects.

The detection method for defects of the disclosure can be used for real-time online on a circular weft-knitted fabric. Before the detection on a new product, only a model needs to be trained to obtain stripe defect feature images with different stitch types and various kinds of common walewise densities, and the detection can be directly performed. For a trained product, corresponding feature images can be stored so that the stored images can be imported into the model for direct detection when the fabric is produced next time, and the training process does not need to be performed again.

The defect detection device of the disclosure can be modified on an original circular knitting machine, so the detection cost is reduced, and the efficiency is improved. Additionally, the defect detection and positioning method based on the gray gradient method is invented, with which the defects can be fast and accurately recognized, and the problem cam can be fast positioned, the defects are avoided or reduced in the knitting process to the greatest extent, the labor productivity is greatly improved, and the enterprise benefits are ensured.

Some steps in the embodiments of the disclosure may be implemented through software, and corresponding software programs may be stored in a readable storage medium, such as an optical disk or a hard disk.

The foregoing descriptions are merely exemplary embodiments of the disclosure, but are not intended to limit the disclosure. Any modification, equivalent substitution, improvement and the like made within the spirit and principle of the disclosure shall fall within the protection scope of the disclosure.

What is claimed is:

1. A method of online detection of circular weft knitting stripe defects, comprising:

acquiring a real-time fabric image when a circular weft knitting machine operates, and using an image having marked courses as a marked image;

calculating a gradient image combining a direction x and a direction y of the real-time fabric image by using a gray gradient method;

extracting texture information of the gradient image by using a gray-level co-occurrence matrix method to obtain feature images;

determining whether the real-time fabric image has defects or not according to the feature images, and determining whether the defects are stripe defects or not; and if the real-time fabric image has defects, and the defects are stripe defects, marking the real-time fabric image as a defect image, and calculating a cam position causing the stripe defects according to a quantity of shot images between the feature images and the marked image, courses in which marks in the marked image are located, courses in which defects in the defect image are located, and machine operation parameters.

2. The method according to claim 1, wherein the determining whether the real-time fabric image has defects or not according to the feature images, and the determining whether the defects are stripe defects or not comprise:

performing comparison recognition on the feature images and a pre-acquired defect sample image so as to determine whether the real-time fabric image has defects or not and whether the defects are stripe defects or not;

a process of acquiring the defect sample image comprises:

acquiring stripe defect fabric images with different stitch types and different stitch densities;

calculating a sample gradient image combining a direction x and a direction y of the stripe defect fabric images by using the gray gradient method;

extracting texture information of the sample gradient image by using the gray-level co-occurrence matrix method to obtain sample feature images; and classifying the acquired sample feature images according to fabric types and fabric densities to obtain a training sample set; and images in the training sample set are collectively referred to as defect sample images.

3. The method according to claim 2, wherein the calculating the cam position causing the stripe defects according to the quantity of shot images between the feature images and the marked image, courses in which marks in the marked image are located, courses in which defects in the defect image are located, and machine operation parameters comprises:

assuming that a height from the marked course in the marked image to a top edge of the marked image is $H_{BJ}$, a height from the stripe defect to a top edge of the defect image is $H_{CD}$, and an on-machine walewise density is cpc (courses/5 cm), then calculating a cam feed of the stripe defects using a formula of $$LS_{CD} = \left( \frac{(H_{CD} - H_{BJ}) \times cpc}{5 \times \text{scale}} - LS_{BJ} \right) \% LS,$$

wherein scale is a scaled-down proportion during fabric image acquisition; and % represents remainder taking, LS is total feeds of a circular weft knitting machine, and $LS_{BJ}$ is a marked feed.

4. The method according to claim 3, wherein the marked courses in the marked image are marked by color yarns.

5. The method according to claim 4, wherein the method adopts an industrial camera to acquire a real-time fabric image when the circular weft knitting machine operates, and an interval time t of the acquisition is:

$$t = \frac{cpc \times H}{5} \times \frac{60}{v \times HL}$$

wherein H is a practical height of a fabric shot by the industrial camera, cm; v is a speed of the circular weft knitting machine, r/min; and HL is a course number corresponding to each revolution of the circular weft knitting machine.

6. The method according to claim 5, wherein the method sets that a fabric image is shot when the circular weft knitting machine rotates over a height shooting range of the industrial camera.

7. The method according to claim 6, wherein the scaled-down proportion scale during fabric image acquisition by the industrial camera is a ratio of a top edge length of the acquired real-time fabric image to a top arc length of a practical image.

8. A system of online detection for circular weft knitting stripe defects, comprising an industrial camera, a circular weft knitting machine and a computer, wherein the industrial camera is disposed outside a take-up and batching mechanism of the circular weft knitting machine, the industrial camera is connected with the computer to transmit an acquired real-time fabric image to the computer, and the computer adopts the method according to claim 1 for stripe defect detection, and calculates a cam position causing the stripe defects when the stripe defects are detected.

9. The system according to claim 8, wherein an illumination lamp is disposed inside a fabric so as to provide a light source, and brightness of the illumination lamp is adjustable.

10. The system according to claim 9, further comprising a warning device, wherein the warning device is connected with the computer, and the warning device automatically warns when stripe defects are detected.

* * * * *